US008963491B2

(12) United States Patent
Tabata et al.

(10) Patent No.: US 8,963,491 B2
(45) Date of Patent: Feb. 24, 2015

(54) CONTACTLESS CHARGING MODULE, CONTACTLESS CHARGING DEVICE, AND METHOD OF MANUFACTURING CONTACTLESS CHARGING MODULE

(71) Applicant: Panasonic Corporation, Osaka (JP)

(72) Inventors: Kenichiro Tabata, Oita (JP); Tokuji Nishino, Oita (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/266,288

(22) Filed: Apr. 30, 2014

(65) Prior Publication Data
US 2014/0232335 A1    Aug. 21, 2014

Related U.S. Application Data

(63) Continuation of application No. 14/002,508, filed as application No. PCT/JP2012/001640 on Mar. 9, 2012, now Pat. No. 8,749,195.

(30) Foreign Application Priority Data

| Mar. 9, 2011 | (JP) | ................................. | 2011-051199 |
| Mar. 9, 2011 | (JP) | ................................. | 2011-051200 |
| Mar. 9, 2011 | (JP) | ................................. | 2011-051210 |
| Mar. 9, 2011 | (JP) | ................................. | 2011-051218 |
| Jun. 20, 2011 | (JP) | ................................. | 2011-135945 |

(51) Int. Cl.
| *H02J 7/00* | (2006.01) |
| *H02J 7/02* | (2006.01) |
| *H01F 27/36* | (2006.01) |
| *H01F 38/14* | (2006.01) |
| *H01F 27/28* | (2006.01) |
| *H02J 5/00* | (2006.01) |

(52) U.S. Cl.
CPC .............. *H02J 7/025* (2013.01); *H01F 27/365* (2013.01); *H01F 38/14* (2013.01); *H02J 5/005* (2013.01); *H02J 7/0042* (2013.01); *H01F 27/2871* (2013.01)
USPC .......................................... 320/108; 320/137

(58) Field of Classification Search
USPC ....................................................... 320/108
See application file for complete search history.

(56) References Cited

U.S. PATENT DOCUMENTS

| 4,583,068 | A | 4/1986 | Dickens et al. |
| 4,777,466 | A | 10/1988 | Bordalen |
| 5,852,394 | A | 12/1998 | Watanabe et al. |
| 7,924,235 | B2 | 4/2011 | Fujimoto et al. |
| 2001/0002787 | A1 | 6/2001 | Hyogo |
| 2003/0085684 | A1 | 5/2003 | Tsukamoto et al. |
| 2004/0251871 | A1 | 12/2004 | Dvorak et al. |
| 2007/0182367 | A1* | 8/2007 | Partovi ........................... 320/108 |
| 2008/0050537 | A1 | 2/2008 | Godyak |
| 2009/0306594 | A1 | 12/2009 | Pang et al. |
| 2010/0007215 | A1 | 1/2010 | Sakuma |
| 2010/0066304 | A1 | 3/2010 | Oshimi |
| 2010/0156344 | A1 | 6/2010 | Innoue et al. |
| 2010/0253153 | A1 | 10/2010 | Kondo |
| 2010/0320843 | A1 | 12/2010 | Kitamura et al. |
| 2012/0007708 | A1 | 1/2012 | Holcomb |
| 2012/0153731 | A9* | 6/2012 | Kirby et al. .................... 307/104 |

FOREIGN PATENT DOCUMENTS

| CN | 101630562 A | 1/2010 |
| JP | 2003-045731 A | 2/2003 |
| JP | 2006-042519 A | 2/2006 |
| JP | 2006-315368 A | 11/2006 |
| JP | 2007-123575 A | 5/2007 |
| JP | 2008-205557 A | 9/2008 |
| JP | 2008-210861 A | 9/2008 |
| JP | 2009-200174 A | 9/2009 |
| JP | 2010-41906 A | 2/2010 |
| WO | 2007/080820 A1 | 7/2007 |
| WO | 2011/001812 A1 | 1/2011 |

OTHER PUBLICATIONS

International Search Report for PCT/JP2012/001640 dated May 15, 2012.
Japanese Office action for application No. 2011-051199 dated Apr. 27, 2011.
Japanese Office action for application No. 2011-051200 dated Apr. 27, 2011.
Japanese Office action for application No. 2011-135945 dated Aug. 31, 2011.

(Continued)

*Primary Examiner* — Arun Williams

(74) *Attorney, Agent, or Firm* — Pearne & Gordon LLP

(57) ABSTRACT

A contactless charging module, a contactless charging device, and a method of manufacturing the contactless charging module, wherein a magnetic sheet can be prevented from being damaged and giving an adverse effect on power transmission characteristic, by adopting a flexible magnetic sheet having slits, and wherein power transmission efficiency of the contactless charging module can be prevented from decreasing significantly. The contactless charging module is provided with: a planar coil unit; a magnetic sheet upon which the planar coil unit is to be mounted; a recess section or a slit that is formed on the magnetic sheet, and that is for housing therein a portion of a conductor wire of the planar coil unit; and a plurality of flexible slits that are for giving flexibility to the magnetic sheet. At least one of the plurality of flexible slits is formed such that a virtual extension line of the flexible slit will be arranged within the width of the recess section or the slit.

17 Claims, 12 Drawing Sheets

(56) References Cited

OTHER PUBLICATIONS

Japanese Office action for application No. 2011-280918 dated Apr. 24, 2012.

Extended European Search Report issued in Application No. 12 75 5170 dated Jan. 29, 2014.

* cited by examiner

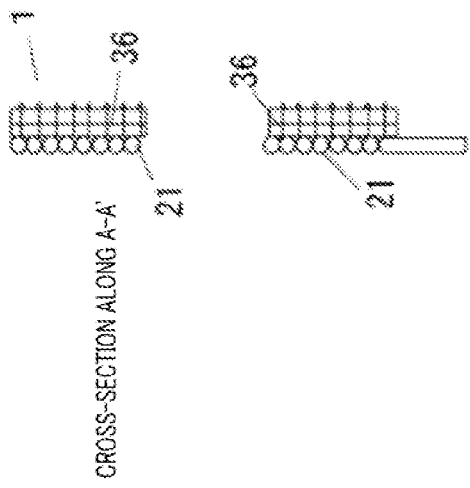
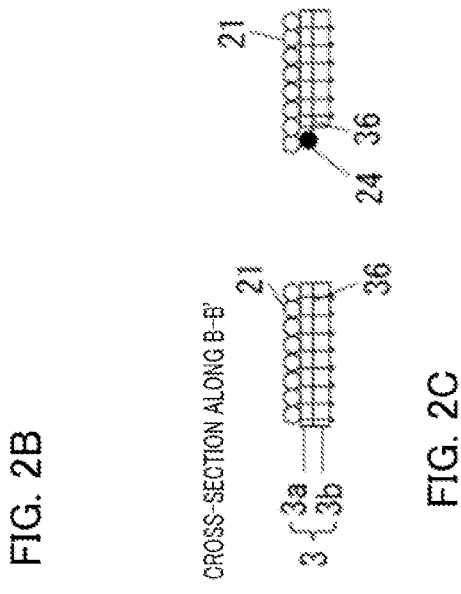
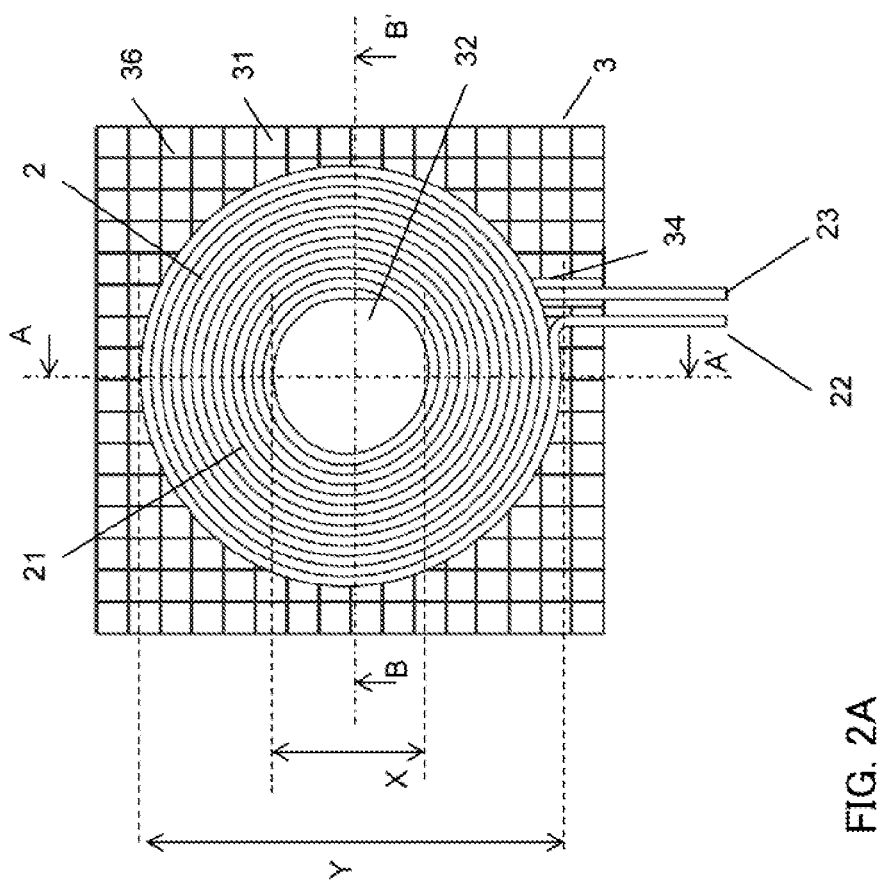

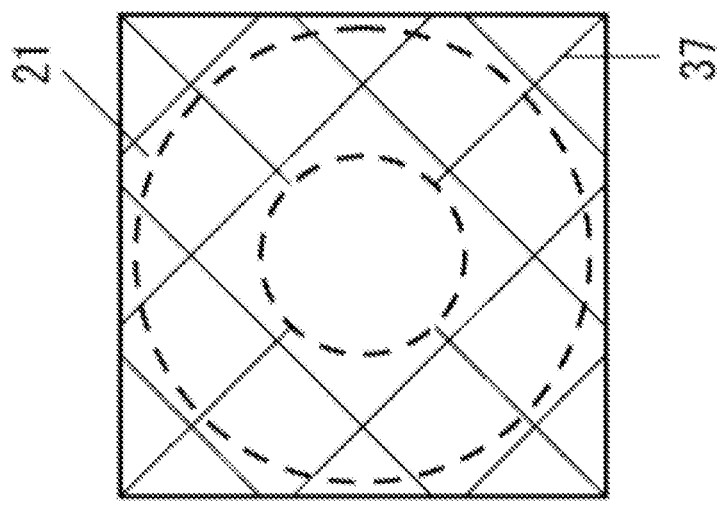
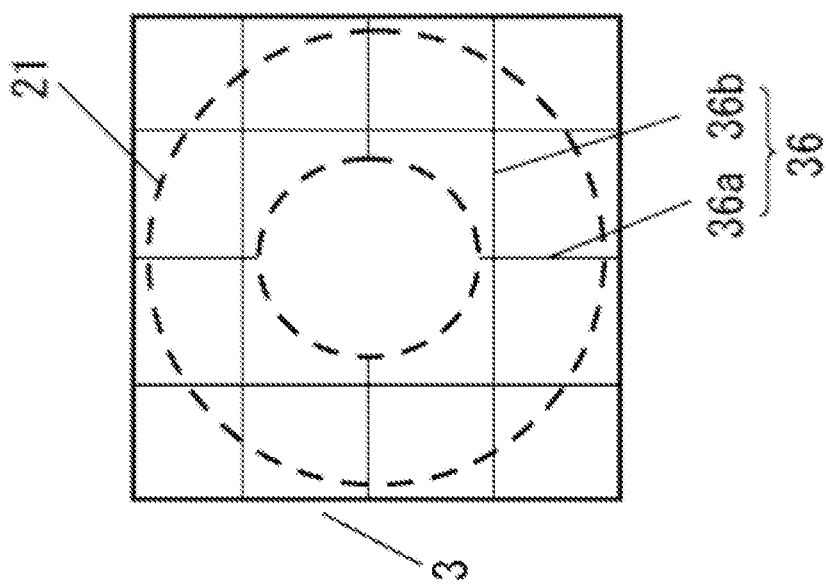
FIG. 4A
FIG. 4B

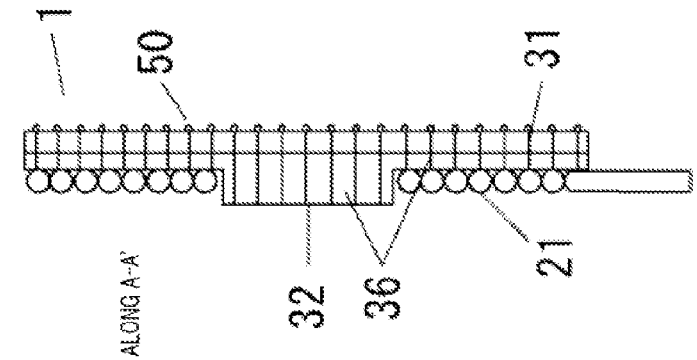
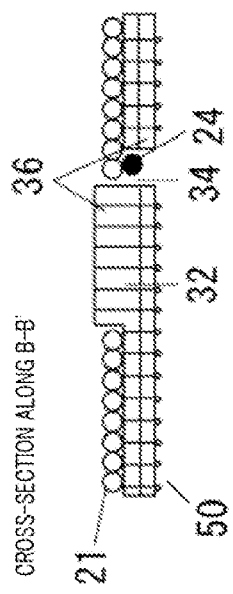
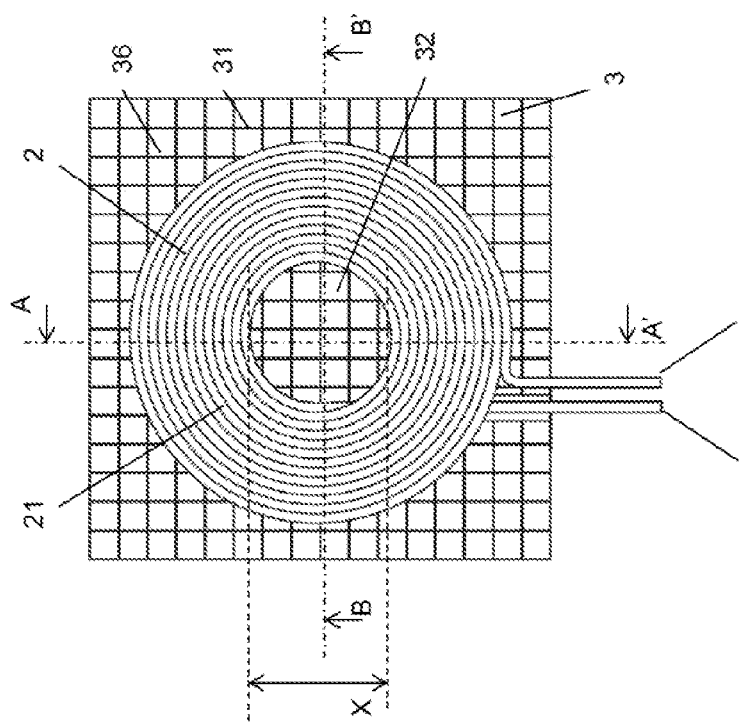
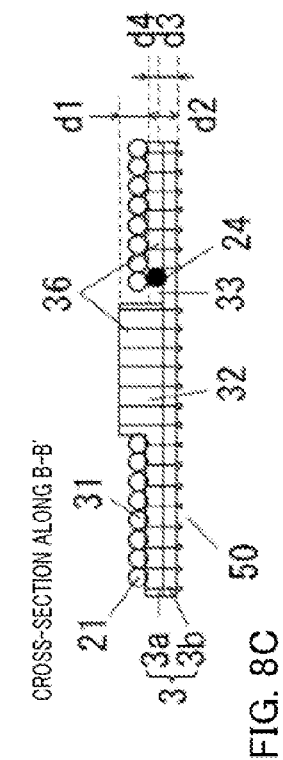
FIG. 8A
FIG. 8B
FIG. 8C
FIG. 8D

CONTACTLESS CHARGING MODULE, CONTACTLESS CHARGING DEVICE, AND METHOD OF MANUFACTURING CONTACTLESS CHARGING MODULE

CROSS-REFERENCE TO RELATED APPLICATIONS

This application is a continuation of U.S. patent application Ser. No. 14/002,508 filed on Aug. 30, 2013 which is based on Japanese Patent Application No. 2011-051200, 2011-051210, 2011-051199 all filed on Mar. 9, 2011 and 2011-051218 filed on Jun. 20, 2011. The contents of these applications are herein incorporated by reference in their entirety.

TECHNICAL FILED

The present invention relates to a non-contact charging module including a planar coil section formed of a wound conductive wire and a magnetic sheet, a non-contact charger and a method of manufacturing a non-contact charging module.

BACKGROUND ART

In recent years, use of a system which enables charging of a main apparatus by a charger in a non-contact manner has become widespread. Such a system includes a power transmission coil on the charger side, and a power reception coil on the main apparatus side. Electromagnetic induction is generated between the coils, whereby electric power is transmitted from the charger side to the main apparatus side. In addition, it has been proposed to apply a portable terminal apparatus or the like as the main apparatus.

There is a demand for reduction in thickness and size of such non-contact charging modules used in main apparatuses, such as portable terminal apparatuses, and chargers. In order to respond to the demand, as in Patent Literature (hereinafter, referred to as "PTL") 1, it is possible that such type of non-contact charging modules each include a planar coil section as a power transmission coil or a power reception coil, and a magnetic sheet. Also, examples of the magnetic sheet include one provided with flexibility by formation of slits as in PTL 2.

CITATION LIST

Patent Literatures

PTL 1
Japanese Patent Application Laid-Open No. 2006-42519
PTL 2
Japanese Patent No. 4400509

SUMMARY OF INVENTION

Technical Problem

The magnetic sheet employed in the non-contact charging module described in PTL 1 is a flat plate-shaped magnetic sheet and has the problem of having no flexibility. For this reason, depending on how to handle the non-contact charging module, the magnetic sheet may be damaged, which adversely affects the power transmission characteristics.

Therefore, it has been considered to mount, in this type of non-contact charging module, the magnetic sheet provided with flexibility by formation of slits, which is described in PTL 2. If the magnetic sheet described in PTL 2 is employed in a non-contact charging module, the magnetic sheet can be flexible; however, the power transmission efficiency decreases due to the group of slits.

An object of the present invention is to provide a non-contact charging module, a non-contact charger and a method of manufacturing a non-contact charging module, which employ a magnetic sheet provided with flexibility by formation of slits, enabling prevention of magnetic sheet damage that adversely affects the power transmission characteristics as well as prevention of a large decrease in power transmission efficiency of the non-contact charging module.

Solution to Problem

A non-contact charging module according to an aspect of the present invention includes: a planar coil section formed of a wound conductive wire; a magnetic sheet on which a coil surface of the planar coil section is to be mounted; a recessed portion or a slit provided in the magnetic sheet, the recessed portion or the slit extending from a winding start point of the planar coil section to an end portion of the magnetic sheet and housing a part of the conductive wire of the planar coil section; and a plurality of flexible slits that provide flexibility to the magnetic sheet, in which at least one of the plurality of flexible slits is formed such that a virtual extension of the flexible slit is placed within a width of the recessed portion or the slit.

A non-contact charger according to the present invention includes the non-contact charging module.

A method of manufacturing a non-contact charging module according to an aspect of the present invention includes: forming a plurality of cuts in one surface of a ferrite sheet; then, bonding a sheet that holds the ferrite sheet to each of the one surface and the other surface of the ferrite sheet, the other surface being a surface opposite to the one surface of the ferrite sheet; then, firing the ferrite sheet; then, applying pressure to the ferrite sheet to form slits that divide the ferrite sheet at the plurality of cuts; and then, bonding the planar coil section formed of a wound conductive wire to the one surface of the ferrite sheet with the sheet interposed in between, in which the planar coil section is bonded so as to avoid projections formed at positions corresponding to the slits in the other surface in the pressure application process.

Advantageous Effects of Invention

According to the present invention, employment of a magnetic sheet provided with flexibility by formation of flexible slits enables prevention of damage of the magnetic sheet, which adversely affects the power transmission characteristics, and inclusion of a flexible slit in a recessed portion or a slit in the magnetic sheet that houses a conductive wire of a planar coil section enables prevention of a large decrease in power transmission efficiency of the non-contact charging module.

BRIEF DESCRIPTION OF DRAWINGS

FIGS. 2A to 2C are conceptual diagrams of the non-contact charging module in the embodiment of the present invention;

FIGS. 4A and 4B illustrate a slit length difference depending on the shape of slits in the non-contact charging module in the embodiment of the present invention;

FIGS. 8A to 8D are conceptual diagrams of the non-contact charging module in the embodiment of the present invention;

DESCRIPTION OF EMBODIMENTS

Embodiments of the present invention will be described below with reference to the accompanying drawings.

(Embodiment 1)

Figure 1:
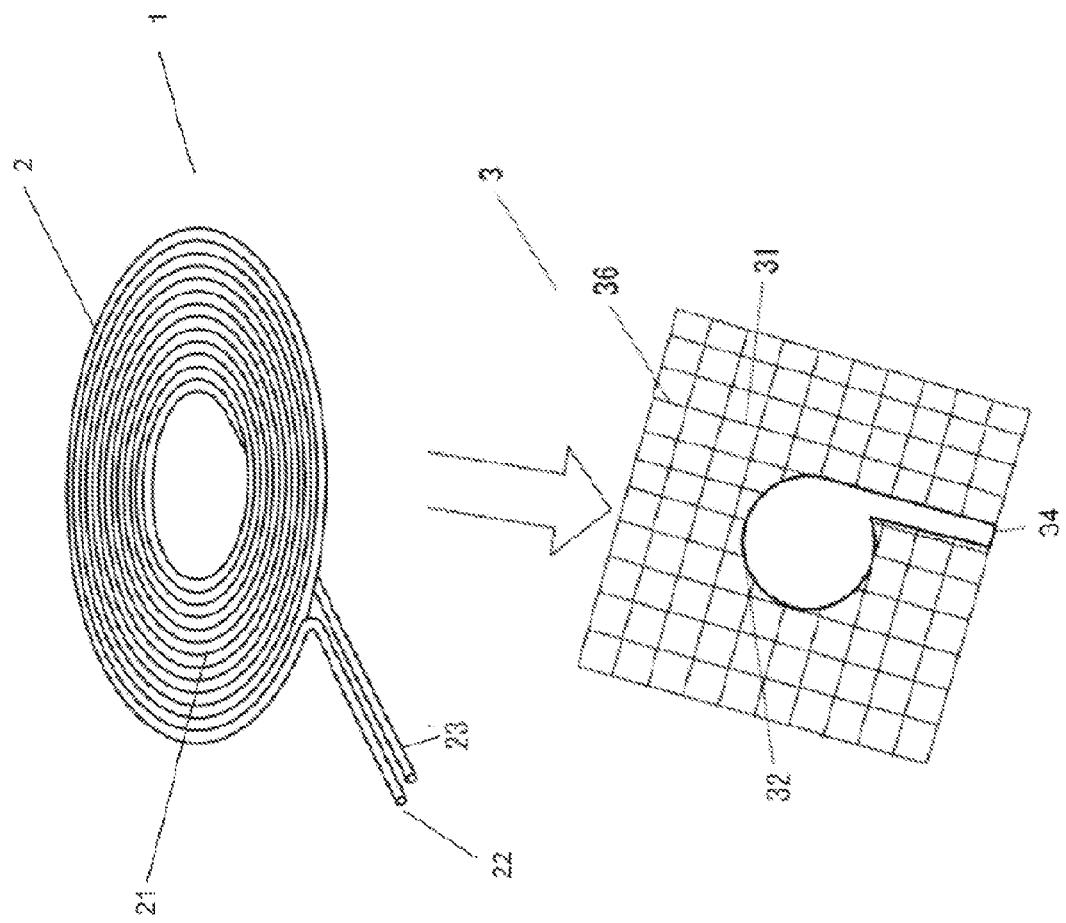
FIG. 1 is an assembly diagram of a non-contact charging module in an embodiment of the present invention.
Figure 3:
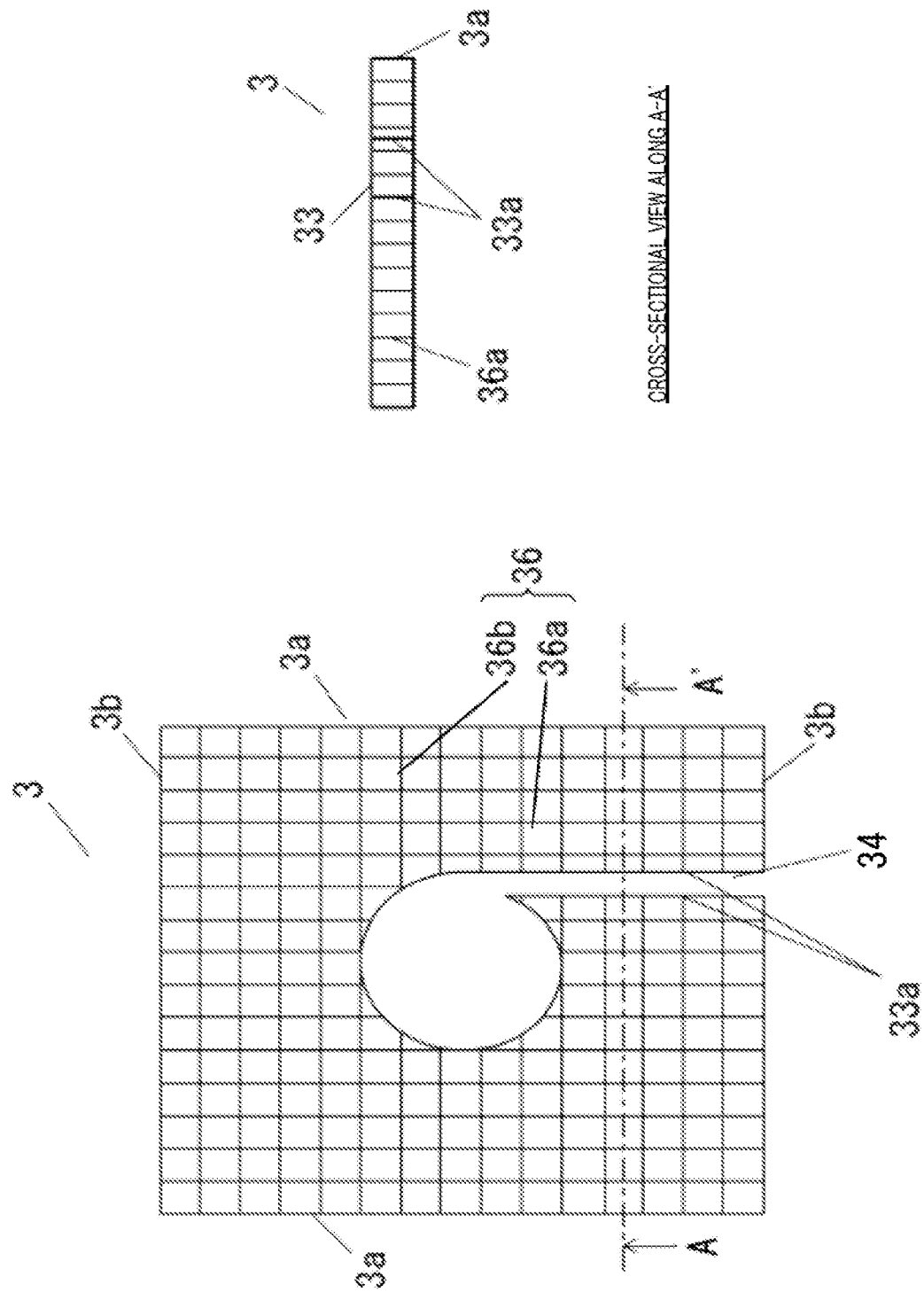
FIG. 3 illustrates details of a magnetic sheet in the non-contact charging module in the embodiment of the present invention.

FIG. 1 is an assembly diagram of a non-contact charging module in an embodiment of the present invention. FIGS. 2A to 2C are conceptual diagrams of the non-contact charging module in the embodiment of the present invention: FIG. 2A is a top view; FIG. 2B is a cross-sectional view along A-A' in FIG. 2A; and FIG. 2C is a cross-sectional view along B-B' in FIG. 2A. FIG. 3 illustrates details of a magnetic sheet in the non-contact charging module in the embodiment of the present invention. FIGS. 4A and 4B illustrate a slit length difference depending on the shape of slits in the non-contact charging module in the embodiment of the present invention. Although in FIGS. 2A to 2C, a size of a slit provided in magnetic sheet 3 and a diameter of a conductive wire of coil 21 appear to have values quite close to each other, in reality, the diameter of the conductive wire is around 0.25 to 0.35 mm and the size of the slit is around 2 mm. It should be understood that the size and the diameter are not limited to these values.

As illustrated in FIG. 1, non-contact charging module 1 according to the present invention includes planar coil section 2 including a conductive wire wound in whorl therein, and magnetic sheet 3 provided so as to face a surface of coil 21 of planar coil section 2. Coil 21 of planar coil section 2 is bonded to a surface of magnetic sheet 3 with no projections generated thereon, using an adhesive. A detailed description of the projections will be given, hereinafter.

Planar coil section 2 includes coil 21 resulting from a conductor being radially wounded so as to swirl on a plane, terminals 22 and 23 provided at opposite ends of coil 21. Coil 21 is one resulting from a conductive wire being parallel-wound on a plane, and a surface formed by the coil is referred to as a coil surface. In this embodiment, coil 21 is wound outward from a bore having a diameter of 20 mm. The outer diameter of coil 21 is 30 mm. That is, coil 21 is wound in a doughnut shape. Coil 21 may be wound in a circular shape or may be wound in a polygonal shape.

Winding the conductive wire so that respective turns of the conductive wire leave a space therebetween decreases the floating capacitance between an upper turn of the conductive wire and a lower turn of the conductive wire, thereby making it possible to minimize the alternating-current resistance of coil 21. In addition, the thickness of coil 21 can be minimized by winding the conductive wire densely.

Also, as illustrated in FIGS. 2A to 2C, in this embodiment, the conductive wire of coil 21 has a circular shape in cross section, but may have, e.g., a rectangular shape. However, compared with a conductive wire having a rectangular shape in cross section, use of a conductive wire having a circular shape results in formation of a gap between adjacent turns of the conductive wire, whereby the floating capacitance between the turns of the conductive wire becomes small, making it possible to minimize the alternating-current resistance of coil 21.

In addition, the alternating-current resistance of coil 21 is lower and the transmission efficiency can be increased when coil 21 is wound in one stage rather than being wound in two stages in the thickness direction. This is because, when the conductive wire is wound in two stages, the floating capacitance is generated between the part of the conductive wire in the upper stage and the part of the conductive wire in the lower stage. Accordingly, it is better to wind a largest possible part of coil 21 in one stage than to wind coil 21 in two stages in its entirety. Also, as a result of winding coil 21 in one stage, non-contact charging module 1 can have a reduced thickness. Here, provision of a low alternating-current resistance of coil 21 enables prevention of loss in coil 21, and enhancement of value L, which is an inductance of coil 21, enables enhancement of the power transmission efficiency of non-contact charging module 1, which depends on value L.

Also, in this embodiment, bore X on the inner side of coil 21 illustrated in FIG. 2A is 10 to 20 mm, and outer diameter Y is approximately 30 mm. In non-contact charging modules 1 having a same installment area, as bore X is smaller, the number of turns of coil 21 can be increased, enabling enhancement of value L.

Terminals 22 and 23 may be arranged close to each other or may be arranged apart from each other. However, when terminals 22 and 23 are arranged apart from each other, non-contact charging module 1 is more easily mounted.

Magnetic sheet 3 is provided to enhance the power transmission efficiency of non-contact charging using electromagnetic induction and reduce magnetic flux leakage to the back side of magnetic sheet 3, and as illustrated in FIG. 2A, magnetic sheet 3 includes flat portion 31, center portion 32 in which a part that is a center and corresponds to the bore of coil 21 has been removed, and slit 34.

As illustrated in FIGS. 2A and 2B, in magnetic sheet 3, V-shaped, longitudinal and lateral slits 36 are formed longitudinally and laterally, with a pitch of 2 mm in order to provide flexibility to the sheet. In other words, a plurality of cuts are made in one surface of magnetic sheet 3, and a tape is adhered to each of opposite surfaces of magnetic sheet 3, and pressure is applied to the surface in which the cuts have been made, to form longitudinal and lateral slits 36. Longitudinal and lateral slits 36 may have any shape as long as such shape is a groove shape, and may have, for example, a U-shape. Although FIGS. 2A to 2C and FIG. 3 illustrate longitudinal and lateral slits 36 in an enlarged manner relative to the other parts, a dimension in width direction of actual longitudinal and lateral slits 36 (groove portions formed in one surface of magnetic sheet 3) is around one-tenth of the diameter of the conductive wire of coil 21.

Center portion 32 of magnetic sheet 3 is not necessarily hollow. Center portion 32 may have a surface that is in plane with flat portion 31 or may have a recessed shape or a projecting shape.

Furthermore, as illustrated in FIG. 2A, by provision of slit 34, a part of the conductive wire from a winding end to terminal 23 of coil 21 (corresponding to the filled circle in FIG. 2C) can be housed in slit 34, enabling reduction in thickness. In other words, slit 34 is formed so as to be substantially perpendicular to an end portion of magnetic sheet 3 and extend along a tangent to an outer circumference of center portion 32 (see FIG. 4). As a result of forming slit 34 as described above, terminals 22 and 23 can be formed without bending the conductive wire. In this case, slit 34 has a length of approximately 15 to 20 mm. However, the length of slit 34 depends on the bore of coil 21.

Slit 34 may be formed in a part in which the end portion of magnetic sheet 3 and the outer circumference of center portion 32 are closest to each other. Consequently, the area in which slit 34 is formed can be minimized, and the transmission efficiency of non-contact charging module 1 can be enhanced. In this case, slit 34 has a length of approximately 5 to 10 mm. In either of the arrangements, an inner-side end portion of slit 34 is connected to center portion 32.

Another arrangement of slit 34 may be employed. In other words, coil 21 desirably has a one-stage structure, and in that case, it is possible that all of turns in a radial direction of coil 21 are formed in one stage or a part of the turns is formed in one stage and another part of the turns is formed in two stages. Accordingly, one of terminals 22 and 23 can be drawn out from an outer circumference of coil 21, but the other has to be drawn out from the inside. Therefore, the wound part of coil 21 and leg portion 24 (FIGS. 8C and 8D) necessarily overlap in the thickness direction. Accordingly, slit 34 may be provided in the overlap part to house leg portion 24. Consequently, non-contact charging module 1 has a uniform height throughout the part in which parts of the conductive wire overlap and the part in which no parts of the conductive wire overlap in coil 21. Here, leg portion 24 refers to a part from a winding end of to terminal 22 or 23 of coil 21. If recessed portion 33 is formed instead of slit 34 (FIG. 8C), neither through hole nor slit is provided in magnetic sheet 3, whereby flux leakage is prevented, enabling enhancement of the power transmission efficiency of non-contact charging module 1. On the other hand, in the case of slit 34, it is easy to form magnetic sheet 3. In the case of recessed portion 33, recessed portion 33 is not limited to one having a rectangular shape in cross section such as illustrated in FIGS. 8A to 8D, and may have a circular arc shape or a rounded shape.

In particular, slit 34 is a linear one that is parallel to a tangent to a circumference of an inner peripheral circle in coil 21 and extends a shortest distance from a point of winding start or winding end in the coil surface to the end portion of magnetic sheet 3. Here, the tangent to the circumference of the inner peripheral circle in the surface of coil 21 refers to a tangent to the inner circumference of the inner peripheral circle at a position where slit 34 that extends from the vicinity of an outer circumference of the inner peripheral circle in the surface of coil 21 is close to the outer circumference of the inner peripheral circle in the surface of coil 21. As a result of slit 34 being formed as described above, terminals 22 and 23 can be formed on magnetic sheet 3 without bending the conductive wire. In other words, since slit 34 is provided and the conductive wire is placed within slit 34, it is necessary to bend the conductive wire in the thickness direction from flat portion 31 toward slit 34. Accordingly, at the part where the conductive wire is placed within slit 34 from flat portion 31, the conductive wire is not bent on magnetic sheet 3, enabling reduction in thickness with the strength of the conductive wire maintained. In this case, the linear portion of slit 34 has a length of approximately 15 to 20 mm. Also, coil 21 may be wound in a polygonal shape, and in such case, slit 34 may be provided along a linear line that is parallel to a shape of a space formed by an inner-side end portion of coil 21 or a tangent to the shape and extends a shortest distance from the point of winding start or winding end in the coil surface to the end portion of magnetic sheet 3.

Also, in magnetic sheet 3, slit 34 that is perpendicular to the tangent to the circumference of the inner peripheral circle in the surface of coil 21 and extends a shortest distance from the point of winding start or winding end in the coil surface to the end portion of magnetic sheet 3 may be formed. Consequently, the area where slit 34 is formed can be minimized, enabling enhancement in transmission efficiency of non-contact charging module 1. In other words, provision of slit 34 results in loss or reduction in thickness of a part of magnetic sheet 3. Accordingly, magnetic flux may leak from slit 34, resulting in some decrease in power transmission efficiency of the non-contact charging module. Therefore, minimization of the area where slit 34 is formed enables reduction in thickness with magnetic flux leakage minimized to maintain the power transmission efficiency of the non-contact charging apparatus. In this case, the linear portion of slit 34 has a length of approximately 5 to 10 mm. Coil 21 may be wound in a polygonal shape, and in such case, coil 21 may be perpendicular to the shape of the space formed by the inner-side end portion in the surface of coil 21 or the tangent to the shape, and thus, slit 34 may be provided in a linear line that extends a shortest distance from the point of winding start or winding end in the coil surface to the end portion of magnetic sheet 3.

In this embodiment, as magnetic sheet 3, a Ni—Zn ferrite sheet, a Mn—Zn ferrite sheet, a Mg—Zn ferrite sheet, or the like can be used. The ferrite sheet can reduce the alternating-current resistance of coil 21 compared with an amorphous metal magnetic sheet.

As illustrated in FIGS. 2B and 2C, in magnetic sheet 3, at least a high saturation magnetic flux density material and a high magnetic permeability material are deposited. Even if neither a high saturation magnetic flux density material nor a high magnetic permeability material is deposited, a high saturation magnetic flux density material having a saturation magnetic flux density of 350 mT or more and a thickness of at least 300 μm may be used.

Magnetic sheet 3 has a size of approximately 33×33 mm, and a high saturation magnetic flux density material and a high magnetic permeability material are deposited with their respective thicknesses set. Magnetic sheet 3 has a thickness of 0.6 mm, the high saturation magnetic flux density material has a thickness of 0.45 mm and the high magnetic permeability material has a thickness of 0.15 mm.

In FIG. 2A, slit 34 is parallel to sides of one pair of opposed end portions of magnetic sheet 3 and perpendicular to sides of the other pair of opposed end portions. This is because magnetic sheet 3 in this embodiment is square. However, the shape of magnetic sheet 3 is not limited to the square shape. Various shapes such as a circular shape and a polygonal shape may be used. Accordingly, for example, magnetic sheet 3 may have a polygonal shape and an end of slit 34 may be perpendicular to a side to which one end thereof abuts to minimize the area of slit 34 in an easy-to-use polygonal magnetic sheet. In particular, magnetic sheet 3 may have a rectangular shape and may be parallel to the sides of one pair of opposed end portions of magnetic sheet 3 and perpendicular to the sides of the other pair of opposed end portions to minimize the area of slit 34 in an easy-to-use rectangular magnetic sheet.

As described above, slit 34 is provided in the part in which coil 21 and leg portion 24 overlap each other, and the surface of coil 21 is provided on flat portion 31. Slit 34 may be somewhat longer or shorter, but favorably can cover at least 80% of the part in which coil 21 and leg portion 24 overlap each other.

A relationship between slit 34 and longitudinal and lateral slits 36 in magnetic sheet 3 will be described in detail with reference to FIG. 3.

As illustrated in FIGS. 1, 2A to 2C and 3, in magnetic sheet 3, longitudinal and lateral slits 36 are provided longitudinally and laterally, respectively, and substantially perpendicular to each other at respective pitches that are substantially equal to each other. The configuration of magnetic sheet 3 is described in detail in PTL 2.

In FIG. 3, longitudinal slits 36a are substantially parallel to sides 3a of magnetic sheet 3, and lateral slits 36b are substantially parallel to sides 3b of magnetic sheet 3. On the other hand, slit 34 linearly extends substantially in parallel to sides 3a of magnetic sheet 3, from side 3b of magnetic sheet 3 toward the circumference of the inner peripheral circle. In other words, longitudinal slits 36a are substantially parallel to end portions 33a of slit 34. Furthermore, slit 34 is provided at a position overlapping a position where at least one longitudinal slit 36a is formed.

Although in this embodiment, slit 34 has a width of 2 mm and longitudinal slits 36a have a pitch of 1.5 mm, the width of slit 34 may be set to approximately 1 to 3 mm and the pitch of longitudinal slits 36a may be set within approximately 1 to 3 mm.

A further description of the positional relationship between slit 34 and longitudinal slits 36a will be described with reference to a cross-sectional view along A-A' in FIG. 3.

As illustrated in FIG. 3, end portions 33a of slit 34 and longitudinal slits 36a are substantially parallel to each other, and thus, as is clear from the cross-sectional view along A-A' in FIG. 3, longitudinal slit 36a extends from side 3b (see FIG. 3) of magnetic sheet 3 and ends at the part where slit 34 is provided. With such configuration, an increase in an area with a reduced thickness of magnetic sheet 3, which deteriorates the magnetic characteristics of magnetic sheet 3, can be prevented by overlapping slit 34 and longitudinal slit 36a, enabling prevention of an adverse effect on the power transmission characteristics of non-contact charging module 1 and also enabling prevention of a large decrease in power transmission efficiency of non-contact charging module 1. Furthermore, since the area with a reduced thickness of magnetic sheet 3 is not increased, an increase in magnetic flux leakage to the back side of magnetic sheet 3 can be prevented. Also, at least one of longitudinal slits 36a is made to correspond to end portion 33a of slit 34, enabling a further increase in flexibility of magnetic sheet 3.

Consequently, slit 34 and longitudinal slits 36a do not obliquely cross each other, and there is only a small area of magnetic sheet 3 that is broken down into small pieces. Accordingly, it is possible to prevent an increase in an area with a reduced thickness of magnetic sheet 3, prevent an adverse effect on the power transmission characteristics of non-contact charging module 1 and also prevent a large decrease in power transmission efficiency of non-contact charging module 1.

Furthermore, slit 34 and longitudinal slits 36a do not diagonally cross each other and there is only a small area of magnetic sheet 3 that is decomposed into small pieces. Accordingly, it is possible to prevent an increase in an area with a reduced thickness of magnetic sheet 3, prevent an adverse effect on the power transmission characteristics of non-contact charging module 1 and also prevent a large decrease in power transmission efficiency of non-contact charging module 1.

Next, a difference depending on the pattern of slits formed in magnetic sheet 3 will be described in detail with reference to FIGS. 4A and 4B.

Two types of slits, i.e., longitudinal and lateral slits 36 and diagonal slits 37 formed in magnetic sheet 3 at a same slit pitch will be described. FIG. 4A illustrates a case of longitudinal and lateral slits 36 where sides of rectangular magnetic sheet 3 and the respective slits are parallel to each other, and FIG. 4B illustrates a case of diagonal slits 37 where the respective slits are inclined at an angle of 45 degrees relative to the respective sides of rectangular magnetic sheet 3. An angle formed by the respective sides of rectangular magnetic sheet 3, which linearly extend, and the respective slits can arbitrarily be set within the aforementioned angle, and thus, it is only necessary that the angles in these two cases be discussed as representative examples.

As illustrated in FIGS. 4A and 4B, where longitudinal and lateral slits 36 in FIG. 4A and diagonal slits 37 in FIG. 4B are compared, there are more diagonal slits 37 existing around opposed corner regions of magnetic sheet 3 relative to longitudinal and lateral slits 36. As the angle formed by the sides of rectangular magnetic sheet 3 and the respective slits increases from an angle of 0 degrees to an angle of 45 degrees, the length of the slits on the diagonal lines increases.

Accordingly, longitudinal and lateral slits 36, which are parallel to the respective sides of rectangular magnetic sheet 3, have a smaller sum of lengths of longitudinal and lateral slits 36 in a unit area around each of end portions, in particular, opposed corner regions of magnetic sheet 3. In other words, since the length of each of the slits formed in magnetic sheet 3 is not unnecessarily long, non-contact charging module 1 using magnetic sheet 3 including longitudinal and lateral slits 36, which has flexibility so as to meet the demand, can prevent a decrease in power transmission efficiency thereof.

Also, if longitudinal slits 36a and lateral slits 36b are not substantially parallel to, but diagonal to sides 3a and sides 3b of magnetic sheet 3, respectively, the part occupied by the slits in the region that coil 21 faces becomes large. In other words, in the end portion regions of magnetic sheet 3, more minute divisional regions such as small triangle regions are provided by diagonal slits 37 crossing one another. If the part occupied by the minute divisional regions provided by the slits becomes large in the part coil 21 faces in magnetic sheet 3, magnetic flux leakage via the slits in the minute divisional regions increases, resulting in a decrease in power transmission efficiency of non-contact charging module 1. In particular, the winding of coil 21 having a rectangular shape is largely affected by such impact.

Furthermore, the areas of the above-described minute divisional regions are different, and thus, the areas of the described minute divisional regions in the part of magnetic sheet 3 that faces coil 21 also vary, resulting in variation in magnetic characteristics of coil 21. However, longitudinal and lateral slits 36, which are parallel to the respective sides of rectangular magnetic sheet 3, enable the minute divisional regions to be eliminated or reduced without limit, and thus, the variation in magnetic characteristics of coil 21 can be reduced.

In other words, magnetic sheet 3 is formed in a rectangular shape, longitudinal slits 36a are substantially parallel to sides 3a of magnetic sheet 3, and lateral slits 36b are substantially parallel to sides 3b of magnetic sheet 3. Longitudinal and lateral slits 36 and sides 3a and 3b of magnetic sheet 3 do not diagonally cross each other, and there are less regions in which magnetic sheet 3 is broken down into small pieces. Since the part occupied by the minute divisional regions provided by the slits in the part coil 21 faces in magnetic sheet 3 is small, there is less magnetic flux leakage via the slits in the minute divisional regions, enabling prevention of a decrease in power transmission efficiency of non-contact charging module 1. In other words, since the parts in which longitudinal and lateral slits 36 are formed are not unnecessarily increased, non-contact charging module 1 using magnetic sheet 3 can prevent a decrease in power transmission efficiency thereof Furthermore, longitudinal slits 36*a* and lateral slits 36*b* are orthogonal to each other at right angles, and thus, do not diagonally cross sides 3*a* and 3*b* of magnetic sheet 3, enabling further decrease in the regions in which magnetic sheet 3 is broken down into small pieces. In other words, since the area of longitudinal and lateral slits 36 that are formed is not unnecessarily increased, non-contact charging module 1 using magnetic sheet 3 can prevent a decrease in power transmission efficiency thereof Also, coil 21 is formed by winding a conductive wire in a circular shape and magnetic sheet 3 is formed in a square shape. In other words, magnetic sheet 3 has a square shape that fits coil 21 having a circular shape, and thus, there are very few unnecessary parts of magnetic sheet 3 that do not contribute to power transmission, enabling non-contact charging module 1 to have a minimum necessary size and to be downsized.

Therefore, as described above, the present invention is configured in such a manner that sides of rectangular magnetic sheet 3 and longitudinal and lateral slits 36 are parallel to each other, respectively. As a result, the parts in which longitudinal and lateral slits 36 are formed can be reduced with the flexibility of magnetic sheet 3 maintained. With such configuration as described above, the parts of longitudinal and lateral slits 36 on the outer peripheral side of the region in which coil 21 is arranged in magnetic sheet 3 can be minimized. As a result, even magnetic sheet 3 with flexibility by provision of slits enables prevention of a decrease in power transmission efficiency of the non-contact charging module.

Longitudinal slits 36*a* and lateral slits 36*b* are formed at respective pitches that are substantially equal to each other. Consequently, the magnetic sheet has no directionality and having flexibility in two directions, i.e., the longitudinal and lateral directions.

Figure 5B:
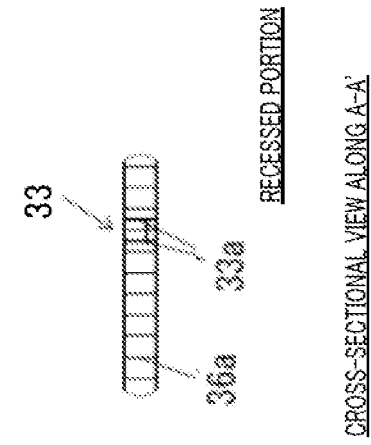
FIGS. 5A to 5C illustrate a shape of a slit in the magnetic sheet in the non-contact charging module in the embodiment of the present invention.
Figure 5C:
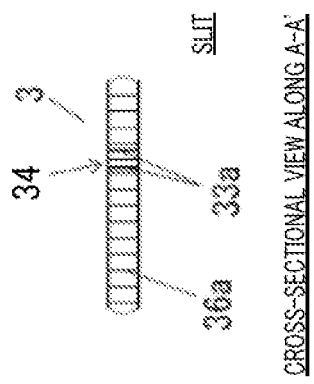
Figure 5A:
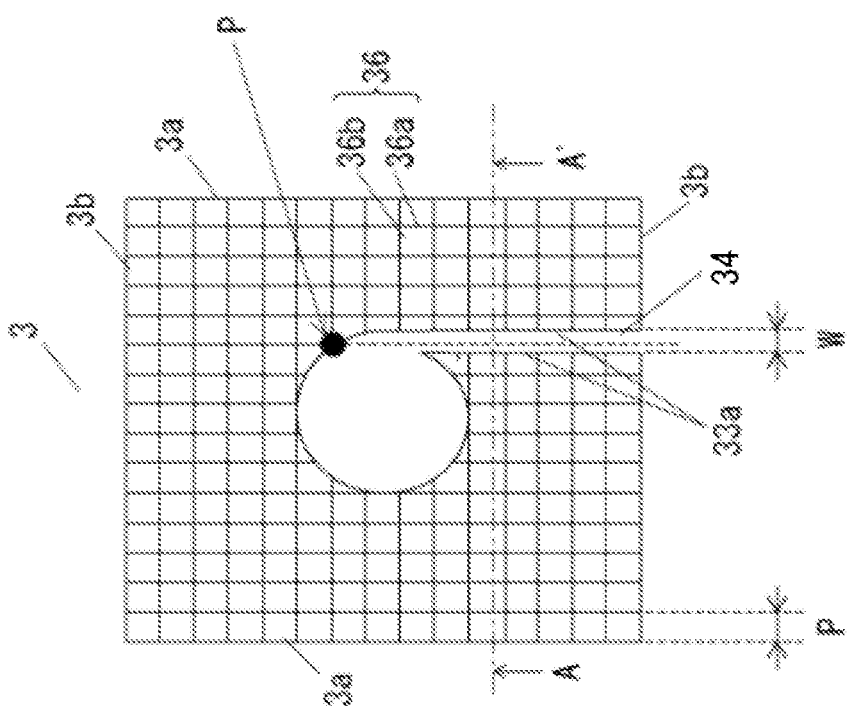

A positional relationship between slit 34 and longitudinal slits 36*a* will be described in detail with reference to FIGS. 5A to 5C. FIGS. 5A to 5C illustrate a shape of a slit in the magnetic sheet in the non-contact charging module according to the embodiment of the present invention: FIG. 5A is a top view, FIG. 5B is a cross-sectional view along A-A' in FIG. 5A where slit 34 is provided, and FIG. 5C is a cross-sectional view along A-A' in FIG. 5A where recessed portion 33 is provided.

In FIGS. 5A to 5C, where W is a width of slit 34 (slit that houses a part of the conductive wire) and P is a pitch of longitudinal slits 36*a* (slits that provide flexibility to the magnetic sheet together with lateral slits 36*b*), the width of slit 34 and the pitch of longitudinal slits 36*a* are set so as to meet W>P, at least one virtual line for interrupted longitudinal slit 36*a* (which is a removed part of the slit in slit 34 and corresponds to a dotted line in FIG. 5A) exists within the width of slit 34. Furthermore, if the above expression is met, more longitudinal slits 36*a* can be formed in magnetic sheet 3, enabling enhancement in flexibility of magnetic sheet 3. Furthermore, many longitudinal slits 36*a* can be housed in slit 34, enabling enhancement of the effect of preventing a decrease in power transmission characteristics of non-contact charging module 1.

On the other hand, where W≤P, longitudinal slits 36*a* and slit 34 may be arranged in magnetic sheet 3 in such a manner that one longitudinal slit 36*a* placed within slit 34.

Although the above description has been provided taking slit 34 as an example, recessed portion 33 may be employed instead of slit 34 as illustrated in the cross-sectional view along A-A' in FIG. 5C.

In other words, where slit 34 is employed, longitudinal slit 36*a* that extends in magnetic sheet ends at a position where longitudinal slit 36*a* reaches slit 34; however, in the case of recessed portion 33, longitudinal slit 36*a* remains in recessed portion 33.

A positional relationship between slit 34 and longitudinal slit 36*a* will be described with reference to the cross-sectional views along A-A' in FIGS. 5B and 5C.

Since, as illustrated in FIG. 5A, end portions 33*a* of slit 34 and longitudinal slit 36*a* are substantially parallel to each other, as is clear from the cross-sectional views along A-A' in FIGS. 5B and 5C, longitudinal slit 36*a* extends from side 3*b* of magnetic sheet 3 (upper portion of magnetic sheet 3 in FIG. 5A) and is interrupted at a side wall of slit 34 or recessed portion 33 (point P) (an extension thereof corresponds to the dotted line in FIG. 5A). In other words, a plurality of longitudinal slits 36*a*, which are slits that provide flexibility to the magnetic sheet, are parallel to a longitudinal direction of slit 34 or recessed portion 33, and any (at least one) of longitudinal slits 36*a* parallel to the longitudinal direction of recessed portion 33 or slit 34 extends from side 3*b* of magnetic sheet 3 toward point P, which is a side end of recessed portion 33 or slit 34. As illustrated in FIG. 5A, recessed portion 33 or slit 34 necessarily includes end portions 33*a*, which are opposite side walls extending in the longitudinal direction parallel to sides 3*a* of magnetic sheet 3, and side ends each connecting end portions 33*a*. In FIG. 5A, since a through hole is provided at a part around a center of magnetic sheet 3, which corresponds to a hollow portion of coil 21, the side end part where point P is located does not directly connect end portions 33*a*, which are the opposite side walls (but connect end portions 33*a* via a circumference of the through hole). However, if the through hole in the center is not provided, the side end part would directly connect end portions 33*a*. Also, point P is located at the side end. In other words, point P where longitudinal slit 36*a* and recessed portion 33 or slit 34 meet is not located in a part of end portion 33*a* of recessed portion 33 or slit 34 that is parallel to longitudinal slit 36*a*. As a result, the extension of longitudinal slit that meets the side end of recessed portion 33 or slit 34 at point P (dotted line in FIG. 5A) is parallel to recessed portion 33 or slit 34 and thus extends in recessed portion 33 or slit 34. Consequently, a part of longitudinal slit 36*a* that meets the side end of recessed portion 33 or slit 34 overlaps recessed portion 33 or slit 34, enabling minimization of leakage of magnetic flux from planar coil section 2 as described above.

Accordingly, an increase in an area with a reduced thickness of magnetic sheet 3, which deteriorates the magnetic characteristics of magnetic sheet 3, can be prevented by overlapping slit 34 and longitudinal slit 36*a*, enabling prevention of an adverse effect on the power transmission characteristics of non-contact charging module 1 and also enabling prevention of a large decrease in power transmission efficiency of non-contact charging module 1. Furthermore, since the area with a reduced thickness of magnetic sheet 3 is not increased, an increase in magnetic flux leakage to the back side of magnetic sheet 3 can be prevented.

Next, a non-contact charger including non-contact charging module 1 according to the present invention is described. A non-contact transmitting apparatus includes a charger including a power transmission coil and a magnetic sheet and a main apparatus including a power reception coil and a magnetic sheet. The main apparatus is an electronic apparatus such as a mobile phone. A circuit on the charger side includes a rectifying and smoothing circuit section, a voltage conversion circuit section, an oscillation circuit section, a display circuit section, a control circuit section, and the power transmission coil. A circuit on the main apparatus side includes the power reception coil, a rectifying circuit section, a control circuit section, and load L mainly formed of a secondary battery.

Power transmission from the charger to the main apparatus is performed using electromagnetic induction action between the power transmission coil of the charger, which is the primary side and the power reception coil of the main apparatus, which is the secondary side.

The non-contact charger in this embodiment includes the non-contact charging module explained above. Therefore, it is possible to reduce the size and the thickness of the non-contact charger in a state in which the sectional area of the plane coil section is sufficiently secured with improved power transmission efficiency.

(Embodiment 2)

An embodiment of the present invention will be described below with reference to the accompanying drawings. Reference numerals that are the same as those of Embodiment 1 refer to components that are the same as those of Embodiment 1.

This embodiment is basically the same as Embodiment 1 except that a positional relationship among recessed portion 33, slit 34 and longitudinal and lateral slits 36 is partly different from that in Embodiment 1.

Figure 6:
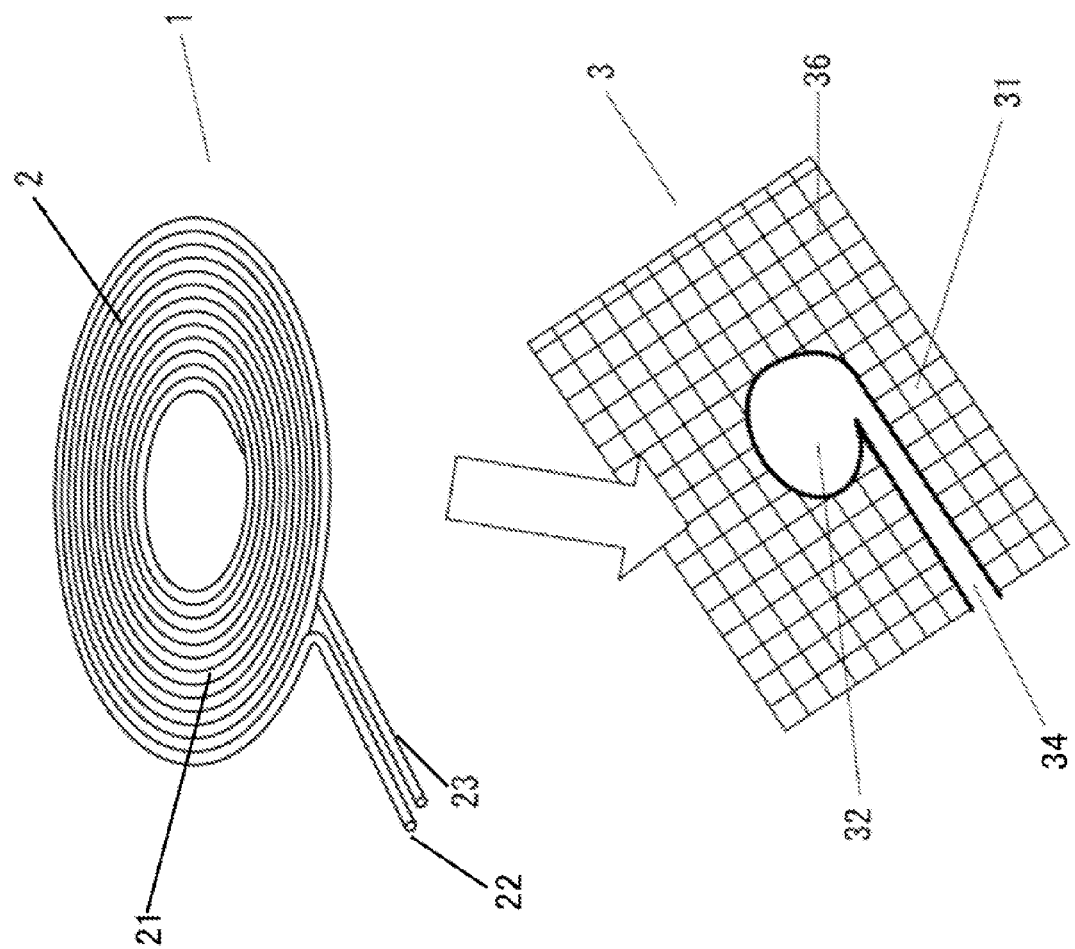
FIG. 6 is an assembly diagram of a non-contact charging module in an embodiment of the present invention.

FIG. 6 is an assembly diagram of a non-contact charging module in this embodiment.

As illustrated in FIG. 6, non-contact charging module 1 in this embodiment includes: planar coil section 2 formed of a wound conductive wire; magnetic sheet 3 on which a coil surface of planar coil section 2 is to be mounted, magnetic sheet 3 being provided so as to face the coil surface of planar coil section 2; recessed portion 33 or slit 34 that is provided in magnetic sheet 3, and that extends from a winding start point of planar coil section 2 to an end portion of magnetic sheet 3 and houses a part of the conductive wire of planar coil section 2; and a plurality of longitudinal and lateral slits 36 that are provided longitudinally and laterally, respectively, in magnetic sheet 3, and that provide flexibility to magnetic sheet 3. Any of slits 36 that provide flexibility is parallel to a longitudinal direction of slit 34 that houses the part of the conductive wire and corresponds to a side surface extending in the longitudinal direction of slit 34.

Also, if longitudinal slits 36a and sides 3a of magnetic sheet 3 are not substantially parallel to each other but are diagonal to each other and lateral slits 36b and sides 3b of magnetic sheet 3 are not substantially parallel to each other but are diagonal to each other, the area of longitudinal and lateral slits 36 becomes large relative to the area coil 21 faces in the part on the outer peripheral side of coil 21 in magnetic sheet 3 (see FIG. 2A). If the area of longitudinal and lateral slits 36 becomes large in the part the coil faces in magnetic sheet 3, magnetic flux leakage via the slits increases, resulting in a decrease in power transmission efficiency of the non-contact charging module.

In other words, magnetic sheet 3 is formed in a rectangular shape, longitudinal slits 36a are substantially parallel to sides 3a of magnetic sheet 3 and lateral slits 36b are substantially parallel to sides 3b of magnetic sheet 3. Longitudinal and lateral slits 36 and sides 3a and 3b of magnetic sheet 3 do not diagonally intersect with each other and there are only few regions in which magnetic sheet 3 is broken down into small pieces. Consequently, effects similar to effects described with reference to slit 34 can be obtained. In other words, the area where longitudinal and lateral slits 36 are formed is not unnecessarily large, enabling prevention of a decrease in power transmission efficiency of non-contact charging module 1 using magnetic sheet 3.

Furthermore, as a result of longitudinal slits 36a and lateral slits 36b being perpendicular to each other, longitudinal slits 36a and lateral slits 36b do not diagonally intersect with end portions 3a and 3b of magnetic sheet 3, and there are only few regions in which magnetic sheet 3 is broken down into small pieces. In other words, the area of longitudinal and lateral slits 36 that are formed is not unnecessarily large, enabling prevention of a decrease in power transmission efficiency of non-contact charging module 1 using magnetic sheet 3.

Therefore, in this embodiment, as described above, arrangement is made so that slit 34 and slits in one direction from among longitudinal and lateral slits 36 (here, longitudinal slits 36a in FIG. 3) are parallel to each other. As a result, the area of longitudinal and lateral slits 36 that are formed can be reduced with the flexibility of magnetic sheet 3 maintained. With such configuration as described above, the area of longitudinal and lateral slits 36 on the outer peripheral side in which coil 21 is arranged in magnetic sheet 3 can be minimized. As a result, even magnetic sheet 3 with flexibility can prevent a decrease in power transmission efficiency of the non-contact charging module.

Also, a slit width of slit 34 is approximately 1 to 3 mm, and a pitch of longitudinal slits 36a is approximately 1 to 3 mm. If the slit width of slit 34 is equal to or larger than the pitch of longitudinal slits 36a, at least one longitudinal slit 36a necessarily falls within slit 34, and slit 34 and longitudinal slit 36a overlap each other, reducing the region of longitudinal slits 36a, enabling prevention of an increase in regions with a reduced thickness of magnetic sheet 3, prevention of an adverse effect on power transmission characteristics of non-contact charging module 1 and prevention of a large decrease in power transmission efficiency of non-contact charging module 1.

Also, if the width of slit 34 is an integral multiple of the length of the pitch of longitudinal slits 36a, end portions 33a of slit 34 and longitudinal slits 36a can be overlapped, enabling further enhancement in flexibility of magnetic sheet 3, prevention of an increase in regions with a reduced thickness of magnetic sheet 3, prevention of an adverse effect on power transmission characteristics of non-contact charging module 1 and prevention of a large decrease in power transmission efficiency of non-contact charging module 1.

Longitudinal slits 36a and lateral slits 36b are formed at respective pitches that are substantially equal to each other. Consequently, the magnetic sheet has no directionality.

(Embodiment 3)

An embodiment of the present invention will be described below with reference to the accompanying drawings. The reference numerals that are the same as those of Embodiments 1 and 2 denote components that are the same as those of Embodiments 1 and 2.

This embodiment relates to a method of manufacturing magnetic sheet 3 in a non-contact charging module according to each of Embodiments 1 and 2. In this embodiment, magnetic sheet 3 specifically refers to a ferrite sheet.

Figure 7:
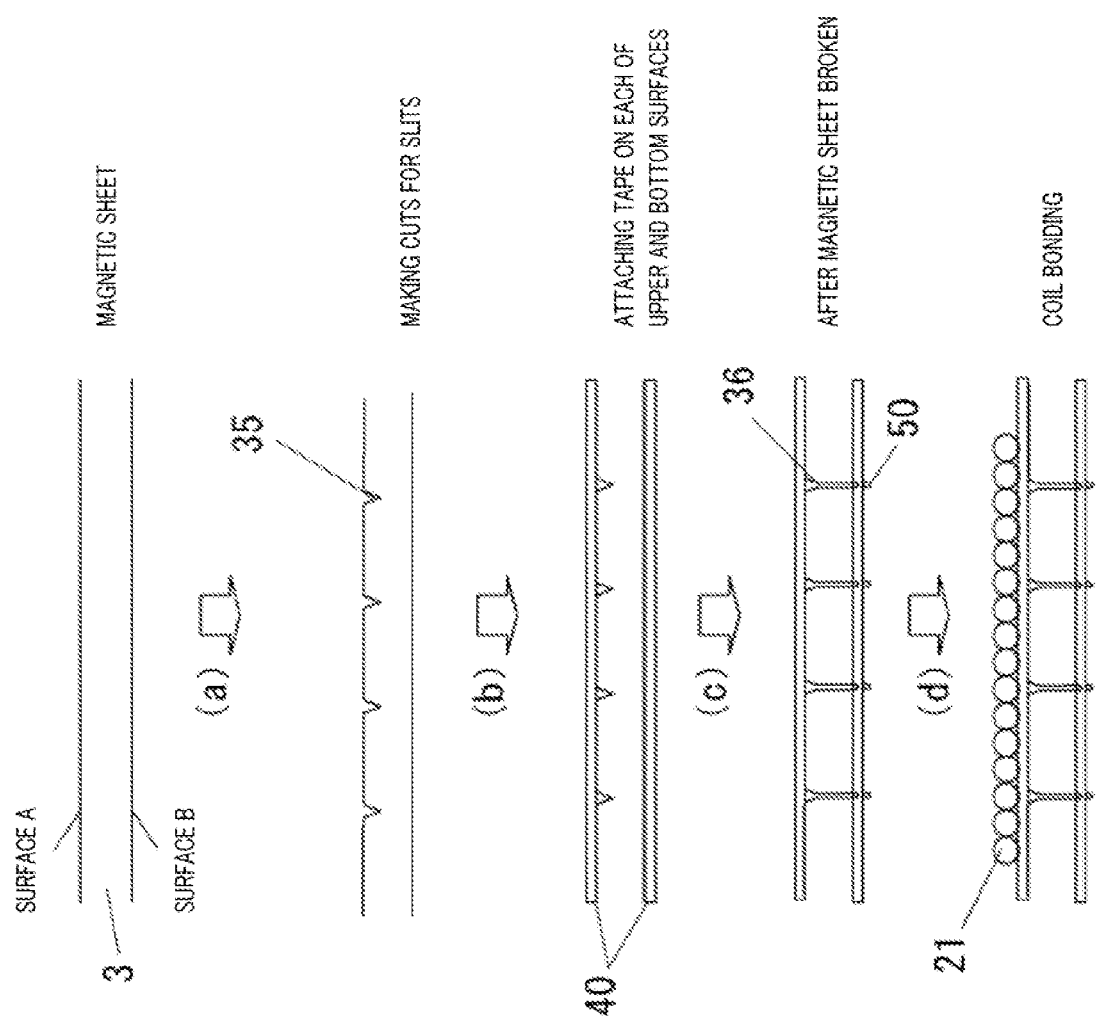
FIG. 7 illustrates a process of manufacturing a non-contact charging module in the embodiment of the present invention.

FIG. 7 illustrates a process of manufacturing a non-contact charging module in this embodiment. FIGS. 8A to 8D are conceptual diagrams of a non-contact charging module in the embodiment of the present invention.

Magnetic sheet 3 used in this embodiment will be described with reference to FIG. 7. In particular, why projections 50 are formed on a surface of magnetic sheet 3 opposed to a surface in which cuts 35 are formed will be described in detail.

First, in the first step ((a) in FIG. 7), cuts 35 with a depth of 0.1 mm are provided at a longitudinal pitch of 2.4 mm and a lateral pitch of 2.4 mm in an upper surface of a ferrite sheet with a thickness of 0.6 mm by means of a cutter blade.

In the second step ((b) in FIG. 7), PET-based bonding sheet 40 including an acrylic adhesive material (product name: 9313B manufactured by Sumitomo 3M Ltd.(registered trademark)) with a thickness of 0.06 mm is bonded to each of opposite surfaces (surfaces A and B in FIG. 7) of magnetic sheet 3 with cuts 35 formed therein to hold magnetic sheet 3.

In the third step ((c) in FIG. 7), after firing magnetic sheet 3 mounted on bonding sheet 40, pressure is applied to magnetic sheet 3 from above by means of, e.g., a roller to divide (break) magnetic sheet 3, as illustrated in the Figure, V-shaped longitudinal and lateral slits 36 are formed (although not illustrated in the drawing, slits are formed longitudinally and laterally). V-shaped longitudinal and lateral slits 36 provide flexibility to magnetic sheet 3 and makes magnetic sheet 3 be less subject to damage. Although each cut 35 has a square shape, each cut 35 may have any of rectangular shapes including a square shape. As a result of each cut 35 having a rectangular shape, flexibility can be provided to magnetic sheet 3 in two directions, i.e., the longitudinal and lateral directions. Magnetic sheet 3 may be divided by applying pressure to magnetic sheet 3 from underneath by means of, e.g. a roller. Consequently, using cuts 35, magnetic sheet 3 are fractured via cuts 35 and thereby divided, and thus, magnetic sheet 3 can easily be broken.

In the third step, minute fragments are formed when pressure is applied to magnetic sheet 3 from above by means of, e.g. a roller to divide magnetic sheet 3 at longitudinal and lateral slits 36. As a result of being pressed by the roller, the minute fragments are pushed out to respective positions below longitudinal and lateral slits 36.

Consequently, multiple projections 50 are generated at the positions on a surface (surface B in FIG. 7) opposed to the surface in which the cutter blade has been inserted (surface A in FIG. 7), the positions corresponding to longitudinal and lateral slits 36.

In the fourth step ((d) in FIG. 7), surface A with no projections 50 generated thereon and coil 21 are bonded to each other using an adhesive. As described above, coil 21 is bonded to surface A of magnetic sheet 3, which has no projections generated thereon, avoiding surface B with projections 50 generated thereon, and thus, neither inclination of a surface of coil 21 nor floating of coil 21 that would occur where coil 21 is bonded to the surface with projections occurs. Consequently, it is possible to ensure that magnetic sheet 3 and coil 21 are flatly bonded to each other, enabling reliable power transmission in non-contact charging module 1.

Also, since the plurality of cuts are made in surface A of magnetic sheet 3, a tape is put on each of the opposite surfaces (surfaces A and B) of magnetic sheet 3 and pressure is applied to the surface with cuts 35 (surface A) to form longitudinal and lateral slits 36, small fragments generated when cuts 35 are made in magnetic sheet 3 can be confined inside magnetic sheet 3, preventing such fragments from adhering to the surface (surface A side) of magnetic sheet 3.

Next, effects brought about when longitudinal and lateral slits 36 are provided in magnetic sheet 3 will be described. While in the case of planar coil section 2 using magnetic sheet 3 with no longitudinal and lateral slits, compared with value L (inductance value of coil 21) of a normal product, value L of magnetic sheet 3 damaged by, e.g., shaking is reduced by around 5%, in the case of planar coil section 2 using magnetic sheet 3 with longitudinal and lateral slits 36, there is almost no change in value L after magnetic sheet 3 is damaged in a manner similar to the above. As described above, provision of longitudinal and lateral slits 36 in magnetic sheet 3 enables reduction of change in value L of planar coil 2 due to damage caused by, e.g., shaking or dropping.

In the embodiment, the representative numerical values are indicated for the thickness of magnetic sheet 3, the depth of cuts in magnetic sheet 3 and the respective pitches of longitudinal and lateral slits 36, which are, however, not limited to these values. It is preferable that magnetic sheet 3 have a thickness of 0.1 to 1 mm, a depth of cuts in magnetic sheet 3 be equal to or smaller than a half of the thickness of magnetic sheet 3 and each of the pitches of longitudinal and lateral slits 36 be 5 mm or less. Also, although, as illustrated in FIG. 7, in magnetic sheet 3, V-shaped longitudinal and lateral slits 36 are formed longitudinally and laterally, respectively, at a pitch of 2 mm in the thickness direction of the magnetic sheet in order to provide flexibility to the sheet, the slits may have any shape as long as such shape is a groove shape, and for example, may have a U-shape.

Accordingly, recessed portion 33 or slit 34 is provided so as to linearly extend in a part in which parts of coil 21 overlap. Here, as illustrated in FIG. 8C, recessed portion 33 is a groove portion including a bottom portion, and as illustrated in FIG. 8D, slit 34 is a groove portion including no bottom portion. Leg portion 24 of coil 21 is positioned inside recessed portion 33 or slit 34, enabling a height of the part in which the parts of coil 21 overlap to be kept to be equal to that of a part in which no parts of coil 21 overlap. Consequently, reduction in thickness of the entire apparatus can be achieved. In particular, linear recessed portion 33 or slit 34 is a linear one that is parallel to a tangent to a circumference of an inner peripheral circle in the surface of coil 21 and extends a shortest distance from a point of winding start or winding in the coil surface to an end portion of magnetic sheet 3. Here, the tangent to the circumference of an inner peripheral circle in the surface of coil 21 refers to a tangent to a circumference of an inner peripheral circle at a position where recessed portion 33 or slit 34 that extends from the vicinity of an outer circumference of the inner peripheral circle in the surface of coil 21 is close to the outer circumference of the inner peripheral circle in the surface of coil 21. As a result of the linear portion of recessed portion 33 or slit 34 being formed as described above, terminals 22 and 23 can be formed without bending the conductive wire on magnetic sheet 3.

Here, in this case, the linear portion has a length of approximately 5 to 10 mm. Since the linear portion is provided on a tangent to the outer circumference of center portion 32 at a shortest distance to an end portion of magnetic sheet 3, the linear portion has a shape parallel to sides 3a of magnetic sheet 3. Note that coil 21 may be wound in a polygonal shape. In that case, recessed portion 33 or slit 34 may be perpendicular to the shape of the space formed by the inner side end of the surface of coil 21 or a tangent to the shape. Therefore, it is advisable to provide recessed portion 33 or slit 34 linearly extending a shortest distance from the winding start or winding end point of the coil surface to the end of magnetic sheet 3.

As described above, coil 21 is bonded to the surface of magnetic sheet 3, which has no projections generated thereon, avoiding surface B with projections 50 generated thereon, and thus, neither inclination of a surface of coil 21 nor floating of coil 21 that would occur where coil 21 is bonded to the surface with projections occurs. Consequently, it is possible to ensure that magnetic sheet 3 and coil 21 are flatly bonded to each other, enabling reliable power transmission in non-contact charging module 1.

Also, while in the case of planar coil section 2 using magnetic sheet 3 with no longitudinal and lateral slits, compared with value L of a normal product, value L of magnetic sheet 3 damaged by, e.g., shaking is reduced by around 5%, in the case of planar coil section 2 using magnetic sheet 3 with longitudinal and lateral slits 36, there is almost no change in value L after magnetic sheet 3 is damaged in a manner similar to the above. As described above, provision of longitudinal and lateral slits 36 in magnetic sheet 3 enables reduction of change in value L of planar coil 2 due to damage caused by, e.g., shaking or dropping and thus enables change in power transmission in non-contact charging module 1.

(Embodiment 4)

An embodiment of the present invention will be described below with reference to the accompanying drawings. Reference numerals that are the same as those of Embodiments 1 to 3 denote components that are the same as those of Embodiments 1 to 3.

This embodiment is partly different from Embodiments 1, 2 and 3 in an arrangement of recessed portion 33 or slit 34 in magnetic sheet 3 in the non-contact charging module.

Figure 9:
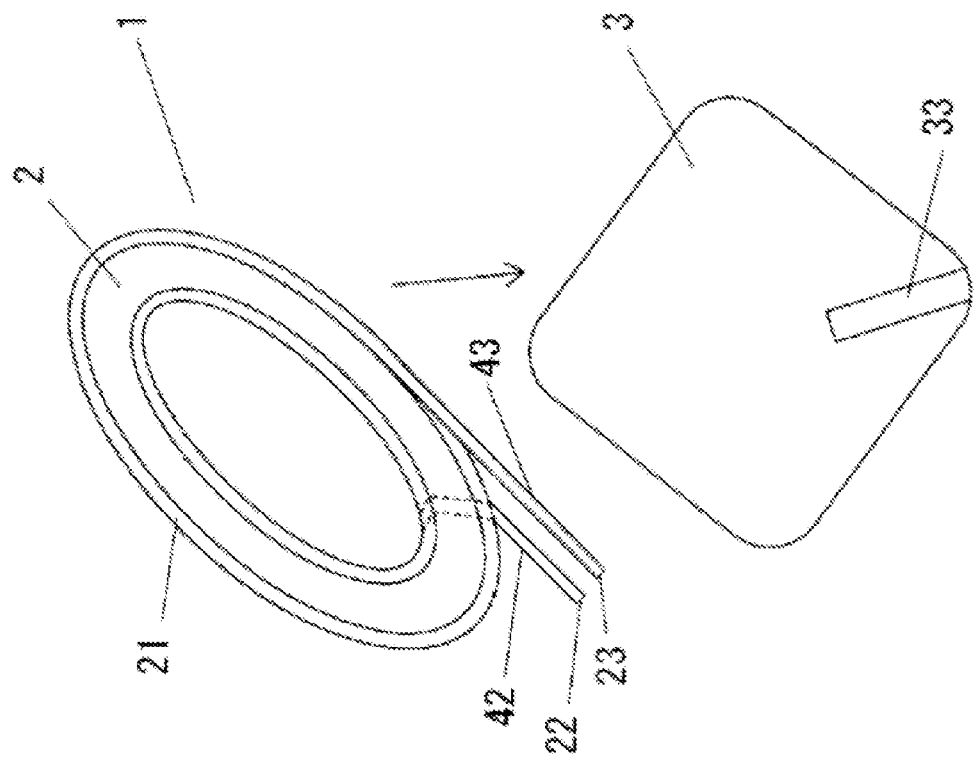
FIG. 9 is an assembly diagram of a non-contact charging module in the embodiment of the present invention.
Figure 10A:
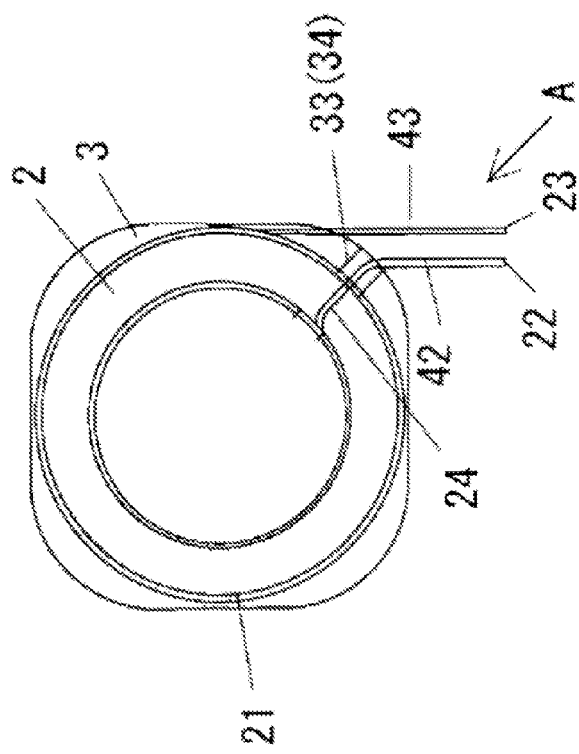
FIGS. 10A to 10C are conceptual diagrams of the non-contact charging module in the embodiment of the present invention.
Figure 10B:
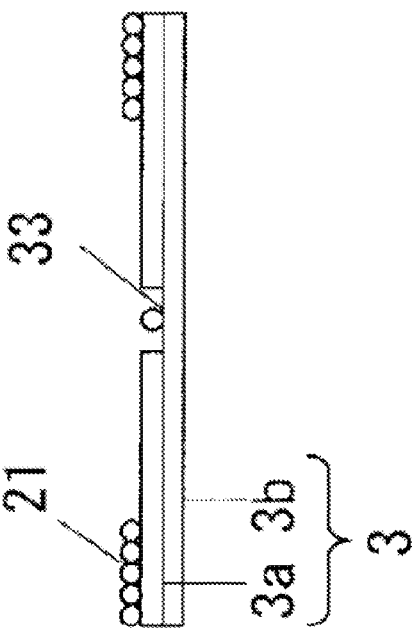
Figure 10C:
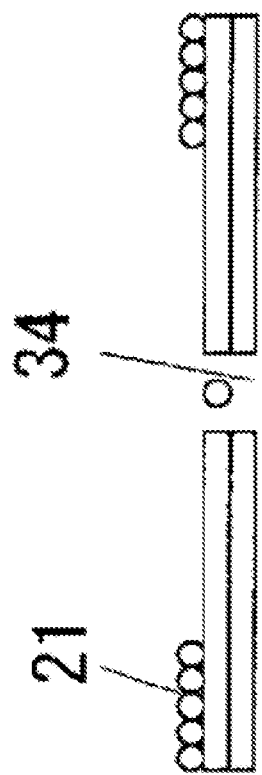
Figure 11:
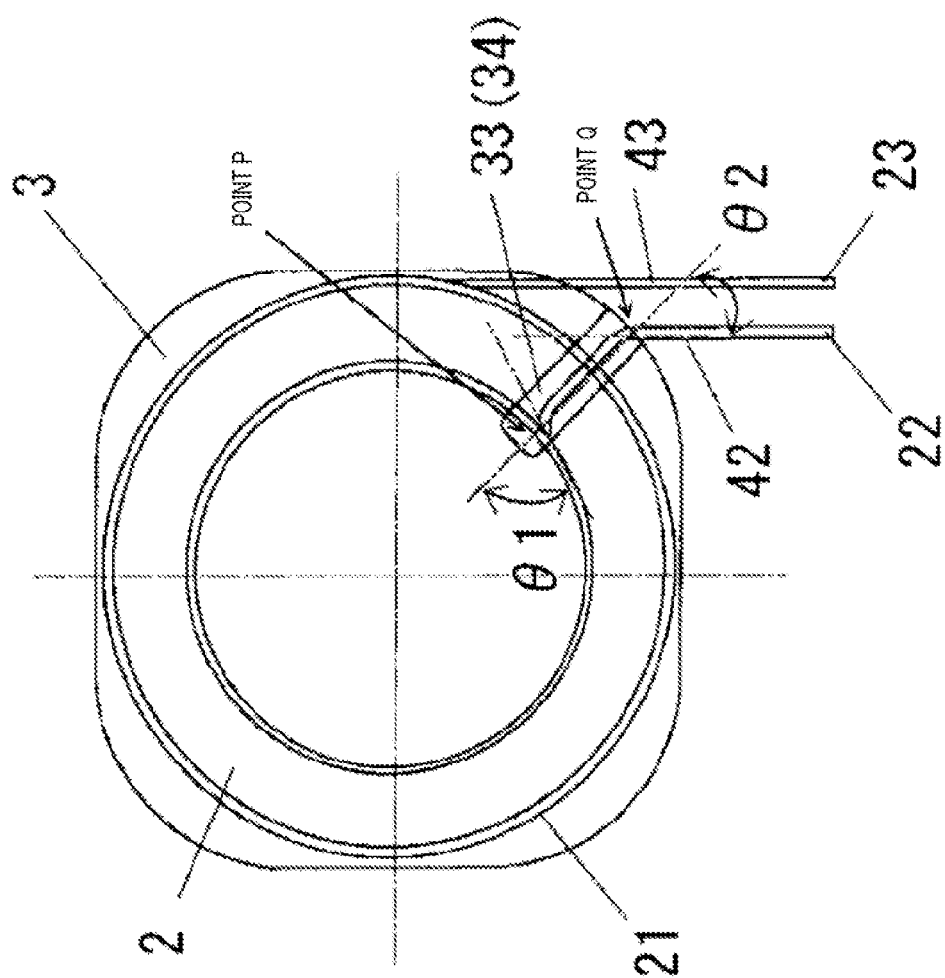
FIG. 11 is a conceptual diagram of a magnetic sheet in the non-contact charging module in the embodiment of the present invention.

FIG. 9 is an assembly diagram of a non-contact charging module in this embodiment. FIGS. 10A to 10C are conceptual diagrams of the non-contact charging module in the embodiment of the present invention. FIG. 11 is a conceptual diagram of a magnetic sheet in the non-contact charging module in the embodiment of the present invention.

In FIGS. 9, 10A to 10C and 11, only an innermost turn and an outermost turn of a conductive wire are illustrated in coil 21 of planar coil section 2; however, the conductive wire of coil 21 is wound between these turns.

If terminals 22 and 23 are arranged close to each other, these terminals can easily be handled when, e.g., attaching the terminals to connectors or providing wiring to a downstream component (to be described in detail, hereinafter).

Magnetic sheet 3 is provided for enhancement in power transmission efficiency of non-contact charging using electromagnetic induction and reduction in magnetic flux leakage to the back surface of magnetic sheet 3, and as illustrated in FIG. 10A, magnetic sheet 3 includes flat portion 31 and recessed portion 33. Also, as illustrated in FIGS. 10B and 10C, recessed portion 33 (FIG. 10B) may be replaced with slit 34 (FIG. 10C). Also, center portion of coil 21 is not necessarily a flat portion and may have a protruding shape. In other words, as illustrate in FIGS. 10B and 10C, provision of recessed portion 33 or slit 34 enables a part of the conductive wire from the winding end to terminal 23 of coil 21 to be housed in recessed portion 33 or slit 34, enabling reduction in thickness.

In this embodiment, recessed portion 33 or slit 34 are formed so as to extend diagonally from a center of magnetic sheet 3. As a result of recessed portion 33 or slit 34 being formed as described above, terminals 22 and 23 can be formed with the conductive wire bent at a small angle. In this case, recessed portion 33 or slit 34 has a length of approximately 15 to 20 mm. However, the length of recessed portion 33 or slit 34 depends on the bore of coil 21. Also, recessed portion 33 or slit 34 has a width and a depth depending on the wire diameter and the number of stages of the conductive wire of coil 21. The width of recessed portion 33 or slit 34 is around three times the wire diameter of the conductive wire of coil 21, and the depth of recessed portion 33 or slit 34 is somewhat larger than the wire diameter of the conductive wire of coil 21 where the conductive wire is wound in a single stage.

Also, corner portions of magnetic sheet 3 are rounded and thereby curved. Adjustment of a radius of the curve enables a space between two conductive wire parts 42 and 43 to be adjusted where conductive wire parts 42 and 43 are drawn out from planar coil section 2 and arranged close to each other, whereby a degree of freedom in arrangement of terminals 22 and 23 is increased, enabling easy assembling of the non-contact charging module. Furthermore, as a result of respective opposed corner portions of magnetic sheet 3 being rounded, magnetic sheet 3 is prevented from becoming larger in size, enabling reduction in size of non-contact charging module 1.

A shape of drawn-out parts of the conductive wire of coil 21 and a groove shape of recessed portion 33 or slit 34 formed in magnetic sheet 3 will be described in detail with reference to FIG. 11. Hereinafter, the description will be provided for the shape of the recessed portion (FIG. 10B) as a representative example; however, the slit shape (FIG. 10C) may also employ a similar configuration and provide similar effects.

As illustrated in FIG. 11, recessed portion 33 is formed so as to extend diagonally from the center of rectangular magnetic sheet 3. In other words, in magnetic sheet 3, a groove of recessed portion 33 is provided at an angle of around 45 degrees relative to a side of magnetic sheet 3. Consequently, bending drawn-out conductive wire part 42 drawn out from coil 21 at point P at an angle smaller than 90 degrees in a direction away from the center of coil 21 ($\theta 1$ in FIG. 11) alone enables drawn-out conductive wire part 42 to be guided to recessed portion 33. Accordingly, no excessive stress is applied to drawn-out conductive wire part 42 at point P, which in turn enables prevention of a decrease in strength of drawn-out conductive wire part 42. In other words, reliability of drawn-out conductive wire part 42 can also be enhanced.

Subsequently, drawn-out conductive wire part 42 is flexed at an angle smaller than 90 degrees ($\theta 2$ in FIG. 11) at point Q in the same direction as the direction in which drawn-out conductive wire part 42 is flexed at point P after passing recessed portion 33. Consequently, drawn-out conductive wire part 42 can be close to and be substantially parallel to drawn-out conductive wire part 43 that has tangentially been drawn out from the outermost turn of coil 21 in parallel to sides of magnetic sheet 3. Specifically, $\theta 1$ is 60 to 80 degrees, and $\theta 2$ is 30 to 50 degrees. In other words, as a result of drawn-out conductive wire part 42 being flexed at two positions with a combination of angles $\theta 1$ and $\theta 2$ within these angle ranges, drawn-out conductive wire part 42 can easily be close to and be substantially parallel to drawn-out conductive wire part 43 that has tangentially been drawn out from the outermost turn of coil 21 in parallel to the sides of magnetic sheet 3, and thus, no excessive stress is applied to drawn-out conductive wire part 42, which in turn enables prevention of a decrease in strength of drawn-out conductive wire part 42.

Also, recessed portion 33 is provided on the side of magnetic sheet 3 where drawn-out conductive wire part 43 has been drawn out (in the fourth quadrant in FIG. 11). Consequently, drawn-out conductive wire part 42 and drawn-out conductive wire part 43 that has tangentially been drawn out from the outermost turn of coil 21 in parallel to the sides of magnetic sheet 3 can be made close to each other.

As a result of the above-described two flexes being provided to drawn-out conductive wire part 42 that has been drawn out from coil 21, two terminals 22 and 23 of planar coil section 2 are arranged close to each other, and thus, can easily be handled where, e.g., these terminals are attached to connectors or wiring to a downstream component is provided.

Also, since the angles of the two flexes of drawn-out conductive wire part 42 are both smaller than 90 degrees, no excessive stress is applied to drawn-out conductive wire part 42, enabling prevention of a decrease in strength of drawn-out conductive wire part 42. In other words, the reliability of drawn-out conductive wire part 42 can also be enhanced.

The present invention has the following characteristics.

(1) A non-contact charging module according to any of the present embodiments includes: a planar coil section formed of a wound conductive wire; a magnetic sheet on which a coil surface of the planar coil section is to be mounted; a recessed portion or a slit provided in the magnetic sheet, the recessed portion or the slit extending from a winding start point of the planar coil section to an end portion of the magnetic sheet and housing a part of the conductive wire of the planar coil section; and a plurality of flexible slits that provide flexibility to the magnetic sheet, and at least one of the plurality of flexible slits is formed so that a virtual extension of the flexible slit is placed within a width of the recessed portion or the slit. In this configuration, employment of the magnetic sheet provided with flexibility by formation of flexible slits enables prevention of an adverse effect on the power transmission characteristics when the magnetic sheet is damaged and prevention of a large decrease in power transmission efficiency of the non-contact charging module by means of a flexible slit being included in the recessed portion or the slit in the magnetic sheet, the recessed portion or the slit housing the conductive wire of the planar coil section.

(2) In the non-contact charging module according to any of the present embodiments, the plurality of flexible slits are parallel to a longitudinal direction of the recessed portion or the slit, whereby an increase in regions with a reduced thickness in the magnetic sheet can be prevented by overlapping the recessed portion or the slit and the flexible slits to a maximum extent.

(3) In the non-contact charging module according to any of the present embodiments, a relationship between width W of the recessed portion or the slit and pitch P of the plurality of flexible slits is W≤P, and the flexible slit is formed such that the virtual extension of the flexible slit is placed within the width of the recessed portion or the slit, whereby a large decrease in power transmission efficiency of the non-contact charging module can be prevented by a flexible slit being included in the recessed portion or the slit in the magnetic sheet, the recessed portion or the slit housing the conductive wire of the planar coil section.

(4) In the non-contact charging module according to any of the present embodiments, the magnetic sheet includes another flexible slit extending in a direction perpendicular to the plurality of flexible slits extending in parallel to the recessed portion or the slit, and the other flexible slits provide flexibility to the magnetic sheet in the direction perpendicular to the plurality of flexible slits extending in parallel to the recessed portion or the slit, whereby the magnetic sheet has no directionality and is flexible in two directions, i.e., longitudinal and lateral directions.

(5) In the non-contact charging module according to any of the present embodiments, the planar coil section is wound in a circular shape and the magnetic sheet has a square shape, and thus, since the magnetic sheet has a square shape that fits a circular coil, there are very few parts of the magnetic sheet that do not contribute to power transmission, and accordingly, the non-contact charging module can have a minimum necessary size and thus can be downsized.

(6) In the non-contact charging module according to any of the present embodiments, a relationship between width W of the recessed portion or the slit and pitch P of the plurality of flexible slits is W>P, and the flexible slit is formed such that the virtual extension of the flexible slit is placed within the width of the recessed portion or the slit, and thus, at least one virtual extension of a flexible slit necessarily exists within the width of the recessed portion or the slit.

(7) In the non-contact charging module according to any of the present embodiments, any of the plurality of flexible slits corresponds to a side wall of the recessed portion or the slit, the side wall extending in the longitudinal direction of the recessed portion or the slit, whereby the flexibility of the magnetic sheet can be further enhanced.

(8) In the non-contact charging module according to any of the present embodiments, the magnetic sheet is a ferrite sheet, whereby an alternating-current resistance of the coil can be decreased.

(9) A method of manufacturing a non-contact charging module according to any of the present embodiments includes: forming a plurality of cuts in one surface of a ferrite sheet; then bonding a sheet that holds the ferrite sheet to each of the one surface and the other surface of the ferrite sheet, the other surface being a surface opposed to the one surface; then firing the ferrite sheet; then applying pressure to the ferrite sheet to form slits that divide the ferrite sheet at the plurality of cuts; and then bonding the planar coil section formed of a wound conductive wire to the ferrite sheet on the one surface of the ferrite sheet via the sheet, whereby the planar coil section is bonded so as to avoid projections formed at positions corresponding to the slits in the other surface in the pressure application process. With this method, neither inclination of a surface of the coil nor floating of the coil that would occur if the coil is bonded to the surface with the projections occurs, ensuring that the magnetic sheet and the coil are reliably and flatly bonded to each other.

(10) A non-contact charger according to any of the present embodiments employs the magnetic sheet provided with flexibility by formation of flexible slits, enabling prevention of an adverse effect on the power transmission characteristics when the magnetic sheet is damaged and prevention of a large decrease in power transmission efficiency of the non-contact charging module by means of a flexible slit being included in the recessed portion or the slit in the magnetic sheet which houses the conductive wire of the planar coil section.

The disclosures of the specifications, the drawings and the abstracts of Japanese Patent Application Nos. 2011-051200, 2011-051210, 2011-051199 and 2011-051218 filed on Mar. 9, 2011, and Japanese Patent Application No. 2011-135945 filed on Jun. 20, 2011 are incorporated herein by reference in their entirety.

INDUSTRIAL APPLICABILITY

A non-contact charging module, a non-contact charger and a method of manufacturing a non-contact charging module according to the present invention employ a flexible magnetic sheet including slits, enabling prevention of an adverse effect on power transmission characteristics caused by the magnetic sheet being damaged and prevention of a large decrease in power transmission efficiency of the non-contact charging module, and thus are useful as non-contact charging modules for various electronic devices such as mobile terminals including mobile phones and mobile computers and the like, and portable devices including camcorders and the like.

REFERENCE SIGNS LIST

1 Non-contact charging module
2 Planar coil section

21 Coil
22, 23 Terminal
24 Leg portion
3 Magnetic sheet
3a, 3b Side
31 Flat portion
32 Center portion
33 Recessed portion
34 Slit
36 Longitudinal and lateral slits
36a Longitudinal slit
36b Lateral slit
37 Diagonal slit

The invention claimed is:

1. A non-contact charging module comprising:
 a planar coil formed of a wound conductive wire;
 a magnetic sheet on which a coil surface of the planar coil is to be mounted and which is provided opposite to the coil surface of the planar coil;
 a recessed portion or a slit provided in the magnetic sheet, the recessed portion or the slit extending from a winding start point of the planar coil to an end portion of the magnetic sheet and housing a part of the conductive wire of the planar coil; and
 a plurality of flexible slits that provide flexibility to the magnetic sheet, wherein:
 a relationship between width W of the recessed portion or the slit and pitch P of the plurality of flexible slits is W≤P;
 at least one of the plurality of flexible slits extends in parallel to a longitudinal direction of the recessed portion or the slit and a virtual extension of the flexible slit is placed within the width of the recessed portion or the slit.

2. The non-contact charging module according to claim 1, further comprising another flexible slit extending in a direction perpendicular to the one or plurality of flexible slits extending in parallel to the recessed portion or the slit; and
 the other flexible slit provides flexibility to the magnetic sheet in the direction perpendicular to the one or plurality of flexible slits extending in parallel to the recessed portion or the slit.

3. The non-contact charging module according to claim 2, further comprising a plurality of the other flexible slits, wherein a distance between the plurality of the other flexible slits corresponds to pitch P of the flexible slits.

4. The non-contact charging module according to claim 2, wherein:
 the end portion of the magnetic sheet connected to an end of the recessed portion or the slit extends linearly; and
 the other flexible slits and the linear end portion of the magnetic sheet are parallel to each other.

5. The non-contact charging module according to claim 1, wherein the planar coil is wound in a circular shape and the magnetic sheet has a square shape.

6. The non-contact charging module according to claim 1, wherein:
 the end portion of the magnetic sheet connected to the end of the recessed portion or the slit extends linearly; and
 the linear end portion of the magnetic sheet and the recessed portion or the slit are connected perpendicularly to each other.

7. The non-contact charging module according to claim 1, wherein the recessed portion or the slit extends linearly.

8. The non-contact charging module according to claim 1, wherein all of the plurality of flexible slits are parallel to one another.

9. The non-contact charging module according to claim 8, wherein all of the plurality of flexible slits are arranged at pitch P of the flexible slits.

10. The non-contact charging module according to claim 1, wherein the magnetic sheet has a polygonal shape.

11. The non-contact charging module according to claim 1, wherein the magnetic sheet is a ferrite sheet.

12. The non-contact charging module according to claim 11, wherein the magnetic sheet has a thickness of 300 μm or more.

13. The non-contact charging module according to claim 1, wherein the magnetic sheet has a saturation magnetic flux density of 350 mT or more.

14. The non-contact charging module according to claim 1, wherein the recessed portion or the slit houses 80% or more of a leg portion which is a part of the conductive wire extending from the winding start point of the planar coil to the end portion of the magnetic sheet.

15. The non-contact charging module according to claim 1, wherein the magnetic sheet is formed of a stack of a plurality of different magnetic sheets.

16. A non-contact charger comprising a non-contact charging module according to claim 1 for power transmission.

17. An electronic device comprising a non-contact charging module according to claim 1 for power reception.

* * * * *